US009846845B2

United States Patent
Sigal et al.

(10) Patent No.: US 9,846,845 B2
(45) Date of Patent: Dec. 19, 2017

(54) HIERARCHICAL MODEL FOR HUMAN ACTIVITY RECOGNITION

(71) Applicant: Disney Enterprises, Inc., a Delaware Corporation, Burbank, CA (US)

(72) Inventors: Leonid Sigal, Pittsburgh, PA (US); Tian Lan, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 938 days.

(21) Appl. No.: 13/683,656

(22) Filed: Nov. 21, 2012

(65) Prior Publication Data

US 2014/0143183 A1 May 22, 2014

(51) Int. Cl.
*G06F 15/18* (2006.01)
*G06N 99/00* (2010.01)

(52) U.S. Cl.
CPC .................. *G06N 99/005* (2013.01)

(58) Field of Classification Search
CPC ............ G06N 99/005; G06F 17/30858; G06K 9/00711
See application file for complete search history.

(56) References Cited

U.S. PATENT DOCUMENTS

| | | | | |
|---|---|---|---|---|
| 7,436,980 | B2 * | 10/2008 | Sigal et al. | 382/103 |
| 8,189,866 | B1 * | 5/2012 | Gu et al. | 382/103 |
| 8,594,425 | B2 * | 11/2013 | Gurman et al. | 382/173 |
| 2005/0286738 | A1 * | 12/2005 | Sigal et al. | 382/103 |
| 2010/0111370 | A1 * | 5/2010 | Black et al. | 382/111 |
| 2010/0278420 | A1 * | 11/2010 | Shet et al. | 382/156 |
| 2011/0182469 | A1 * | 7/2011 | Ji et al. | 382/103 |
| 2013/0058535 | A1 * | 3/2013 | Othmezouri et al. | 382/103 |

(Continued)

FOREIGN PATENT DOCUMENTS

WO   WO 2005119596 A1 * 12/2005

OTHER PUBLICATIONS

Lan et al., "Social Roles in Hierarchical Models for Human Activity Recognition", Jul. 21 2012, Computer Vision and Pattern Recognition (CVPR), 2012 IEEE Conference, pp. 1354,1361 (URL:http://ieeexplore.ieee.org/stamp/stamp.jsp?tp=&arnumber=6247821&isnumber=6247647).*

(Continued)

*Primary Examiner* — Paulinho E Smith
(74) *Attorney, Agent, or Firm* — Patterson + Sheridan, LLP (57) ABSTRACT

The disclosure provides an approach for recognizing and analyzing activities. In one embodiment, a learning application trains parameters of a hierarchical model which represents human (or object) activity at multiple levels of detail. Higher levels of detail may consider more context, and vice versa. Further, learning may be optimized for a user-preferred type of inference by adjusting a learning criterion. An inference application may use the trained model to answer queries about variable(s) at any level of detail. In one embodiment, the inference application may determine scores for each possible value of the query variable by finding the best hierarchical event representation that maximizes a scoring function while fixing the value of the query variable to its possible values. Here, the inference application may approximately determine the best hierarchical event representation by iteratively optimizing one level-of-detail variable at a time while fixing other level-of-detail variables, until convergence.

22 Claims, 3 Drawing Sheets

(56) References Cited

U.S. PATENT DOCUMENTS

| | | | | |
|---|---|---|---|---|
| 2013/0271458 | A1* | 10/2013 | Andriluka et al. | 345/420 |
| 2014/0143183 | A1* | 5/2014 | Sigal et al. | 706/12 |
| 2014/0198948 | A1* | 7/2014 | Sigal et al. | 382/103 |
| 2014/0294360 | A1* | 10/2014 | Raptis et al. | 386/239 |

OTHER PUBLICATIONS

Yao et al., "Recognizing Human-Object Interactions in Still Images by Modeling the Mutual Context of Objects and Human Poses", Sep. 2012, IEEE, Tranactions on Pattern Analysis and Machine Intelligence, vol. 34 No. 9, pp. 1691-1703.*
Efros et al, "Recognizing Action at a Distance", Oct. 2003, IEEE Internation Conference on Computer Vision, pp. 1-8.*
Brubaker et al., "Physics-Based Human Motion Modeling for People Tracking: A Short Tutorial", Sep. 27, 2009, pp. 1-48.*
Sigal et al., "Measure Locally, Reason Globally: Occulsion-Sensitive Articulated Posed Estimation", 2006, IEEE Computer Society Conference on Computer Vision and Pattern Recognition (CVPR '06), pp. 1-8.*
Lan et al., "Social Roles in Hierarchical Models for Human Activity Recognition", Jun. 16-21, 2012, Computer Vision and Pattern Recognition (CVPR), 2012 IEEE Conference, pp. 1354-1361 (URL:http://ieeexplore.ieee.org/stamp/stamp.jsp?tp=&arnumber=6247821&isnumber=6247647).*
M.R Amer and S. Todorovic. "A Chains Model for Localizing Participants of Group Activities in Videos." ICCV, pp. 786-793. Nov. 2011.
M.C. Chang; N. Krahnstoever; S. Lim; and T. Yu. "Group Level Activity Recognition in Crowded Environments Across Multiple Camera." 2nd Workshop on Activity Monitoring by Multi-Camera Surveillance Systems, Boston, MA. pp. 56-63. Aug. 29, 2010.
W. Choi; K. Shahid; and S. Savarese. "Learning Context for Collective Activity Recognition." CVPR, pp. 3273-3280. Apr. 30, 2011.
F. Cupillard; F. Bremond; and M. Thonnat. "Group Behavior Recognition with Multiple Cameras." WACV, pp. 177-183, Orlando, FL., Dec. 2002.
A. Gupta; P. Srinivasan; J. Shi; and L.S.Davis. "Understanding Videos, Constructing Plots—Learning a Visually Grounded Storyline Model from Annotated Videos." CVPR, pp. 2012-2019, Miami, FL., Jun. 20-25, 2009.
S.S. Intille and A. Bobick. "Recognizing Planned, Multiperson Action." CVIU, 81: pp. 414-445, Cambridge, MA., Jan. 13, 2001.
D. Kuettel; M.D. Breitenstein; L.V. Gool; and V. Ferrari. "What's Going On? Discovering Spatio—Temporal Dependencies in Dynamic Scenes." CVPR, pp. 1951-1958, Jun. 13-18, 2010.
T. Lan; Y. Wang; W. Yang; S. Robinovitch; and G. Mori. "Discriminative Latent Models for Recognizing Contextual Group Activities." PAMI, vol. 34, Issue 8. pp. 1549-1562, Aug. 2011.
C.C. Loy; T. Xiang; and S. Gong. "Modelling Activity Global Temporal Dependencies Using Time Delayed Probabilistic Graphical Model." ICCV, pp. 120-127, London, UK., Sep. 29-Oct. 2, 2009.
G. Medioni; I. Cohen; F. Bremond; S. Hongeng; and R. Nevatia. Event Detection and Analysis from Video Streams. PAMI, vol. 23 Issue (8): pp. 873-889, Los Angeles, CA., Aug. 2001.
R. Mehran; A. Oyama; and M. Shah. "Abnormal Crowd Behavior Detection Using Social Force Model." CVPR, pp. 935-942, Orlando, FL., Jun. 20-25, 2009.
D. Moore and I. Essa. "Recognizing Multitasked Activities from Video Using Stochastic Context-Free Grammar." AAAI, pp. 770-776, Menlo Park, CA., Sep. 29, 2002.
A. Patron-Perez; M. Marszalek; A. Zisserman; and I.D. Reid. "High Five: Recognising Human Interactions in TV Shows." BMVC, pp. 1-11, Oxford, UK., Aug. 31-Sep. 3, 2010.
R. Poppe. "A Survey on Vision-Based Human Action Recognition." Image and Vision Computing, vol. 28 Issue 6: pp. 976-990, Jun. 2010.
M. Ryoo and J. Aggarwal. "Stochastic Representation and Recognition of High-Level Group Activities." IJCV, vol. 93, Issue 2: pp. 183-200, Jun. 2011.
C. Schuldt; I. Laptev; and B. Caputo. "Recognizing Human Actions: A Local Sym Approach." ICPR, vol. 3: pp. 32-36, Stockholm, Sweden, Aug. 23-26, 2004.
X. Wang; X. Ma; and E. Grimson. "Unsupervised Activity Perception in Crowded and Complicated Scenes Using Hierarchical Bayesian Models." PAMI, vol. 31 Issue (3): pp. 539-555, Mar. 2009.
W. Choi; K. Shahid; and S. Savarese. "What are They Doing? Collective Activity Classification Using Spatio-Temporal Relationship Among People." Visual Surveillance, pp. 1282-1289, Ann Arbor, MI., Sep. 27-Oct. 4, 2009.

* cited by examiner

HIERARCHICAL MODEL FOR HUMAN ACTIVITY RECOGNITION

BACKGROUND

Field

Embodiments presented herein provide techniques for recognizing and analyzing human activity in multi-person scenes and, in particular, recognizing activity using a hierarchical model which describes human behavior at multiple levels of detail.

Description of the Related Art

Automated human activity recognition has focused on recognition of low-level single-person actions or, alternatively, higher levels of abstraction, such as scene-level representations of activity. Where higher levels of abstraction are recognized, activity at lower levels typically have been treated as latent intermediate representations of little inherent interest. The accuracy of such approaches in recognizing human activity is limited.

SUMMARY

One embodiment of the invention includes a computer implemented method for recognizing and analyzing activities. The method includes learning parameters of a classifier in a training operation based on feature vectors and activity elements corresponding to objects during one or more annotated example executions, where the classifier represents activity elements at multiple levels of detail. The method further includes extracting feature vectors corresponding to objects that interact during a test execution, determining, based on the extracted feature vectors and using the classifier, activity elements associated with the one or more objects, at the multiple levels of detail Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Embodiments disclosed herein provide techniques for recognizing and analyzing activities. Although, in describing this invention the focus is on activities related to team games, embodiments of this invention may be applied to any activity or interaction involving a group of objects. In one embodiment, a learning application trains parameters of a hierarchical model, based on annotated example execution(s) (i.e., occurrences) of the game (or other group activity or interaction), where the hierarchical model represents activity elements, discussed below, at multiple levels of detail. Higher levels of detail may consider more context provided by behavior of other persons, and vice versa. In general, the model may represent levels of detail relating to actions of individuals, their social roles and interactions, and an overall event depicted in a scene. For example, in the context of field hockey, the model may include a model (i.e. any classifier) used to predict individual actions (e.g., "pass," "shot," etc.), as well as higher-level models used to predict social roles (e.g., "attacker," "defender," etc.) and overall scene events (e.g., "attack play," "penalty corner," etc.). Learning may be optimized for a user-preferred inference by adjusting learning criteria (e.g., a loss function) while leaving the hierarchical structure of the model unchanged.

An inference application may use the trained model to respond to queries about any variable(s) at any level of detail in test execution(s) (i.e., occurrences of the game or group activity or interaction for which inferences are to be made). For example, queries may be directed to the actions or social roles of a particular person, to the overall event depicted in the scene, etc., or a combination of these. In one embodiment, the inference application may determine scores for each possible value of the query variable(s) (e.g., each possible action where the query is directed to actions of a particular person) by finding the best hierarchical event representation that maximizes a scoring function while fixing the value of the query variable to its possible values. In such a case, the inference application may also approximately determine the best hierarchical event representation by iteratively optimizing one level-of-detail variable at a time while fixing other level-of-detail variables, until convergence.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Figure 1A:
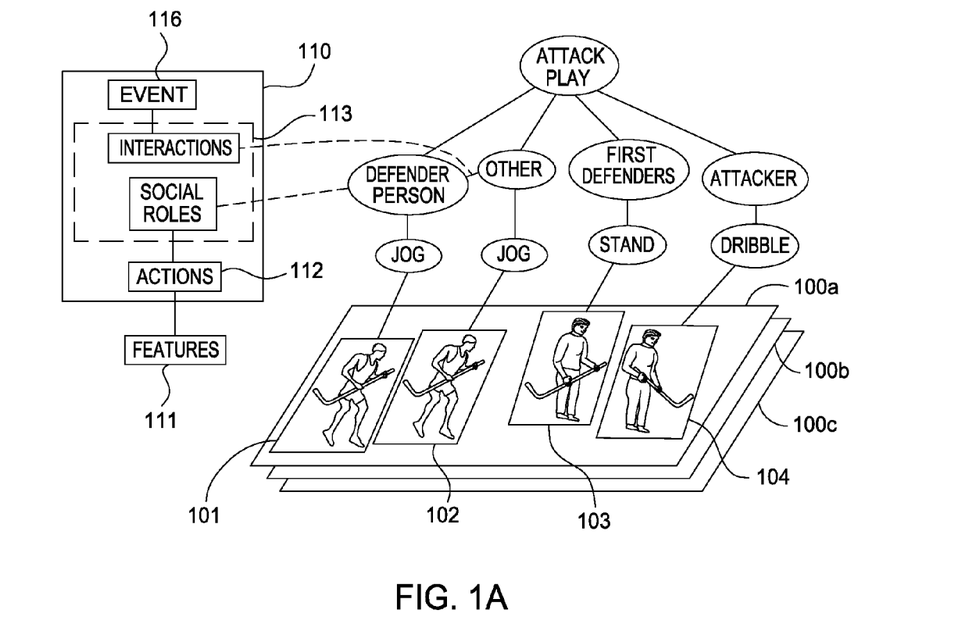
FIG. 1A illustrates an example hierarchical model for recognizing and analyzing activities, according to an embodiment of the invention.

FIG. 1A illustrates an example hierarchical model 110 for recognizing and analyzing human (or any other objects') activity, according to an embodiment. As shown, the hierarchical model 110 includes multiple levels of detail. Higher levels of detail may account for more context provided by behavior of additional persons (or objects), and vice versa. Illustratively, the hierarchical model 110 includes a low-level model 112 of an individual's actions, a mid-level model 113 of social roles and interactions, and a high-level model of events 116. Of course, the hierarchical model 110 may include additional levels of detail. For example, the hierarchical model 110 may include a level above the high-level model of events 116 which models a type of activity (e.g., a sport) to which the events belong.

As used herein, "activity element" refers to a type of activity at a level of detail, e.g., an action of an object, a social role of an object, an event within a game, etc. In general, the hierarchical model 110 may represent a set of graph structures (e.g. directed or undirected graphs) which include activity elements at multiple levels of detail as vertices, as well as edges connecting any set of the vertices. Here, the edges may connect vertices at the same level of detail and vertices at different levels of detail.

Processing each video frame, regions of the video image that correspond to objects' foreground (or outline) may be extracted. Pixels associated with these foregrounds are characterized by various features 111 such as color, shape, optical flow, or texture. For example, histogram of oriented gradient (HOG) features may be extracted from a person's bounding box 101-104. Various characteristic features may be extracted from the current frame image or from multiple-video-frame tracklets $100_a$-$100_c$ and may be concatenated to create the feature vector. The low-level model 112 models compatibility between a person's feature vector and potential actions which the person may be performing. At the mid-level 113, the model 110 accounts for contextual information by modeling interactions between persons in terms of their social roles, which naturally capture important interactions between persons. The high-level model 116 represents scene-level events, which are dependent on the social roles. That is, the events of high-level model 116 may depend on the social roles and interactions of the underlying mid-level model 113, which may themselves depend on the actions of low-level model 112, and vice versa. For example, during certain events a person with a given social role may tend to appear in a certain position in the scene. In general, incorporating multiple levels of detail into the hierarchical model 110 helps account for the fact that, e.g., persons having some social roles may be more likely to perform certain actions, and vice versa, as well as account for interdependencies between other levels of detail. Doing so permits improved activity recognition at the action level, the social role level, the scene event level, etc., as well as combinations of such levels.

The hierarchical model 110 may be adapted to any application domain in which group activities or interactions occur. Examples include sports videos, interactive video games, surveillance footage, etc. The model may be derived from video or from any sensory data from which objects' characteristic information may be extracted. Illustratively, the hierarchical model 110 has been adapted to video frames 100a-100c of the sport field hockey. Here, low-level actions of individual players may generally be divided into classes such as "pass," "receive," "dribble," "shot," "tackle," "prepare," "stand," "jog," "run," "walk," "save," and the like. Of course, actions in other activities than field hockey would be divided into different classes. Mid-level social roles in field hockey may be divided into classes such as "attacker," "first defender," "defender defending against person," "defender defending against space," and "other." The "attacker" is someone who controls the ball and the defenders may be classified as "first defenders" if they defend against the attacker and otherwise as defenders defending against person or defenders defending against space. Players from the same team as the attacker, the referee, and the goalie may be assigned the "other" label. In this model, each person in the scene may be labeled with both an action and a social role. For example, someone depicted as shooting the ball may be labeled with the action "shot" and further labeled with the social role "attacker." Additionally, the overall event depicted by the field hockey video may be labeled as one of a number of classes, such as "attack play," "free hit," "penalty corner," and the like.

Figure 1B:
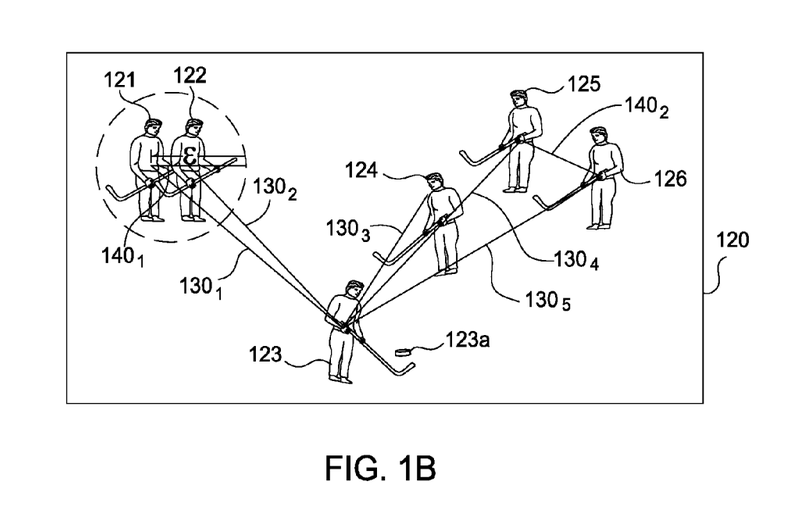
FIG. 1B illustrates an example graph for representing mid-level social roles and interactions, according to an embodiment of the invention.

As discussed, the model 110 is a discriminative model which may be used to learn structures of connectivity (i.e. graphs) among activity elements, where a graph's vertices may correspond to activity elements at various levels of detail and the graph may further include a set of edges between activity elements. Here, the edges may represent, for example, interactions between social roles, but edges may also represent other correlations and statistical relationships depending on the particular activity elements which the edge connects. Parameters of the model may be learned based on video(s) of example execution(s) (i.e., occurrences) of the games (other group activities or interactions) or any other means of capturing (e.g. telemetry) the examples. One possible graph for the scene depicted in the multiple-video-frame tracklets $100_a$-$100_c$ is illustrated in FIG. 1.

After learning, the model 110 provides a framework which may be used for making various inferences in test execution(s), depending on user preferences. In particular, the structure of the model 110 may remain unchanged while learning criteria (e.g., a loss function's parameters) are altered, thereby optimizing learning for a user-preferred inference. In the case of field hockey, user-preferred inferences may include, for example, finding the "attacker," recognizing the action or social role of each player, etc.

As discussed, in one embodiment, each depicted person may be associated with two labels: action and social role. Let $h_i \in \mathcal{H}$ and $r_i \in \mathcal{R}$ be the action and social role of person i, respectively, where $\mathcal{H}$ and $\mathcal{R}$ are the sets of possible action and social role labels, respectively. In addition, each segment from a video sequence may be associated with an event label $y \in \mathcal{Y}$, where $\mathcal{Y}$ is the set of possible event labels. Hence, a video sequence may include several events each associated with a different segment within the sequence. Then a score for interpreting video sequence I with a hierarchical event representation may be defined, for example, as:

$$F_w(x,y,r,h,I) = w^T \Phi(x,y,r,I) = \Sigma_j w_1^T \phi_1(x_j,h_j) + \Sigma_j w_2^T \phi_2(h_j, r_j) + \Sigma_{j,k} w_3^T \phi_3(y,r_j,r_k) + \Sigma_j w_4^T \phi_4(r_j,y), \quad (1)$$

where $w_1^T \phi_1(x_j,h_j)$ is an action model, $w_2^T \phi_2(h_j,r_j)$ is a unary role model, $\Sigma_{j,k} w_3^T \phi_3(y, r_j, r_k)$ is a pairwise role model, and $\Sigma_j w_4^T \phi_4 (r_j, y)$ is an event model.

The action role model $w_1^T \phi_1(x_j,h_j)$ is a potential function, and may be a standard linear model for predicting an action label of the j-th person. For example, the action role model $w_1^T \phi_1(x_j,h_j)$ may be parameterized as:

$$w_1^T \phi_1(x_j,h_j) = \sum_{b \in \mathcal{H}} w_{1b}^T \mathbb{1}(h_j = b) \cdot x_j, \quad (2)$$

where $x_j$ is the feature vector associated with the j-th person. As discussed, various features may be extracted from, e.g., the j-th person's bounding box (or image foreground) in one or multiple video-frame tracklets based on data analysis, and the extracted features may be concatenated to create the feature vector $x_j$. In one embodiment, the feature vector $x_j$ may not be a vector of raw features, but rather an N-dimensional vector in which the k-th entry is a score of classifying for instance using a multi-class classifier (e.g., a support vector machine classifier) trained based on raw features and associated actions. Note, any discriminative feature known in the art, such as features based on color, texture, shape, optical flow, depth, etc., may be used.

The unary role model $w_2^T \phi_2(h_j, r_j)$ is a potential function which represents the properties of social roles, including dependencies between the action $h_j$ and the social role $r_j$ of the j-th person. The unary role model $w_2^T \phi_2(h_j, r_j)$ may be used to predict the social role of a person in the scene without considering other persons, and parameterized, for example, as:

$$w_2^T \phi_2(h_j, r_j, I) = \sum_{c \in \mathcal{R}} \sum_{b \in \mathcal{H}} w_{2cb} \cdot \mathbb{1}(h_j = b) \cdot \mathbb{1}(r_j = c) + \quad (3)$$

-continued
$$\sum_{c \in \mathcal{R}} \sum_{m \in \mathcal{M}} w_{2ck} \cdot \mathbb{1}(r_j = c) \cdot bin_m(j).$$

Here, each video frame is divided into M cells, and $bin_m(j)=1$ if the j-th person is depicted in the m-th cell, and 0 otherwise. In one embodiment, such spatial binning is performed with respect to a reference. Doing so permits $bin_m(j)$ to be invariant to changes in camera view. For example, in the case of field hockey, the goal may be used as the reference such that, if the goal appears at the left of the video frame, then the first bin may start at the bottom left of the image, and vice versa if the goal appears at the right of the video frame. In an embodiment, the spatial binning may be performed with respect to a real-world coordinate system. This may be accomplished by calibrating the camera, a process that allows mapping positions in image space to their corresponding 3D real-world position.

The pairwise role model $\Sigma_{j,k} w_3^T \phi_3(y, r_j, r_k)$ is a potential function which represents dependencies between a pair of social roles $r_j$ and $r_k$ under an event y. The pairwise role model $\Sigma_{j,k} w_3^T \phi_3(y, r_j, r_k)$ may be used to predict the social role of a person in the scene while considering the roles of other persons, and parameterized, for example, as:

$$w_3^T \phi_3(y,r_j,r_k) = \sum_{a \in \mathcal{Y}} \sum_{b \in \mathcal{R}} \sum_{c \in \mathcal{R}} w_{3abc}^T$$
$$\mathbb{1}(y=a) \cdot \mathbb{1}(r_j=b) \cdot \mathbb{1}(r_k=c) \cdot d_{jk} + \sum_{b \in \mathcal{R}}$$
$$\sum_{c \in \mathcal{R}} w_{3abc}^T \cdot \mathbb{1}(r_j=b) \cdot \mathbb{1}(r_k=c) \cdot g_{jk}. \quad (4)$$

Here, $d_{jk}$ is the feature that bins the relative locations of the j-th and k-th persons into one of D spatial relations, such as "overlap," "next-to," "near," "above," "below," and the like. More specifically, $d_{jk}$ may be represented as a sparse vector of all zeros except a single one for the bin occupied by the satisfied spatial relation. As discussed, binning may be performed with respect to a reference, e.g., in the 2D image space or the 3D real-world space. For example, in the case of field hockey, $d_{jk}$ may be defined as "above" when the goal appears at the right of an image and the j-th person appears to the right of the k-th person in the image. In addition, $g_{jk}$ is a two-dimensional vector equal to [1, 0] if the j-th and k-th persons are on the same team, and to [0,1] otherwise.

The event model $\Sigma_j w_4^T \phi_4(r_j, y)$ is potential function which represents the properties of scene-level events, including dependencies between the social role $r_j$ of the j-th person and the overall event depicted in the scene y. Similar to the unary role model, the event model $\Sigma_j w_4^T \phi_4(r_j, y)$ may be parameterized, for example, as:

$$\sum_j w_4^T \phi_4(r_j, y) = \sum_{d \in \mathcal{Y}} \sum_{c \in \mathcal{R}} w_{4dc} \cdot \mathbb{1}(r_j = c) \cdot \mathbb{1}(y = d) + \quad (5)$$
$$\sum_{c \in \mathcal{R}} \sum_{m \in \mathcal{M}} w_{4ck} \cdot \mathbb{1}(r_j = c) \cdot bin_m(j),$$

where the video frame is divided into M cells, and $bin_m(j)=1$ if the j-th person is depicted in the m-th cell, and 0 otherwise.

FIG. 1B illustrates an example graph for representing mid-level social roles and interactions, according to an embodiment. As discussed, a hierarchical model may represent a set of graph structures (e.g. directed or undirected graphs) which include activity elements at multiple levels of detail as vertices, as well as edges connecting any set of the vertices at the same level of detail and at different levels of detail. Parameters of the hierarchical model may be learned based on video(s) of example execution(s) or any other means of capturing (e.g. telemetry) the examples. Then, as discussed in greater detail below, an inference application may iterate over possible graphs represented by the hierarchical model to optimize one or more activity elements for test execution(s).

Illustratively, an undirected graph $\mathcal{G} = (\mathcal{V}, \mathcal{E})$ may be used to represent one part of a hierarchical model graph, namely a graph of the mid-level social roles and interactions, with vertices $v_i \in \mathcal{V}$ of the graph corresponding to social roles $r_i$ and edges $(v_j, v_k) \in \mathcal{E}$ corresponding to interactions between social roles $r_i$ and $r_j$. In one embodiment in which the social roles $r_i$ include a central figure (e.g., an "attacker," a leader, etc.) who affects all others, the central figure may be connected to every other person in the graph $\mathcal{G}$, whereas each of the other persons may be connected only to the nearby person(s) within a distance of $\epsilon$. Of course, other graph structures may be used, depending on the application.

Illustratively, the video frame 120 depicts a field hockey scene in which a player 123 is shooting a ball 123a, while other players 121-122 and 124-126 converge on the shooting player 123. As shown, mid-level social roles and interactions in the video frame 120 may be represented by a graph which connects the shooting player 123, whose role is that of "attacker" (i.e., a central figure affecting all others), to each of the other players—who may be "first defenders," "other," etc. —via edges $130_1$-$130_5$. The graph connects player pairs 121-122 and 125-126, each having players less than a distance $\epsilon$ from the other players, via edges $140_1$ and $140_2$.

Figure 2:
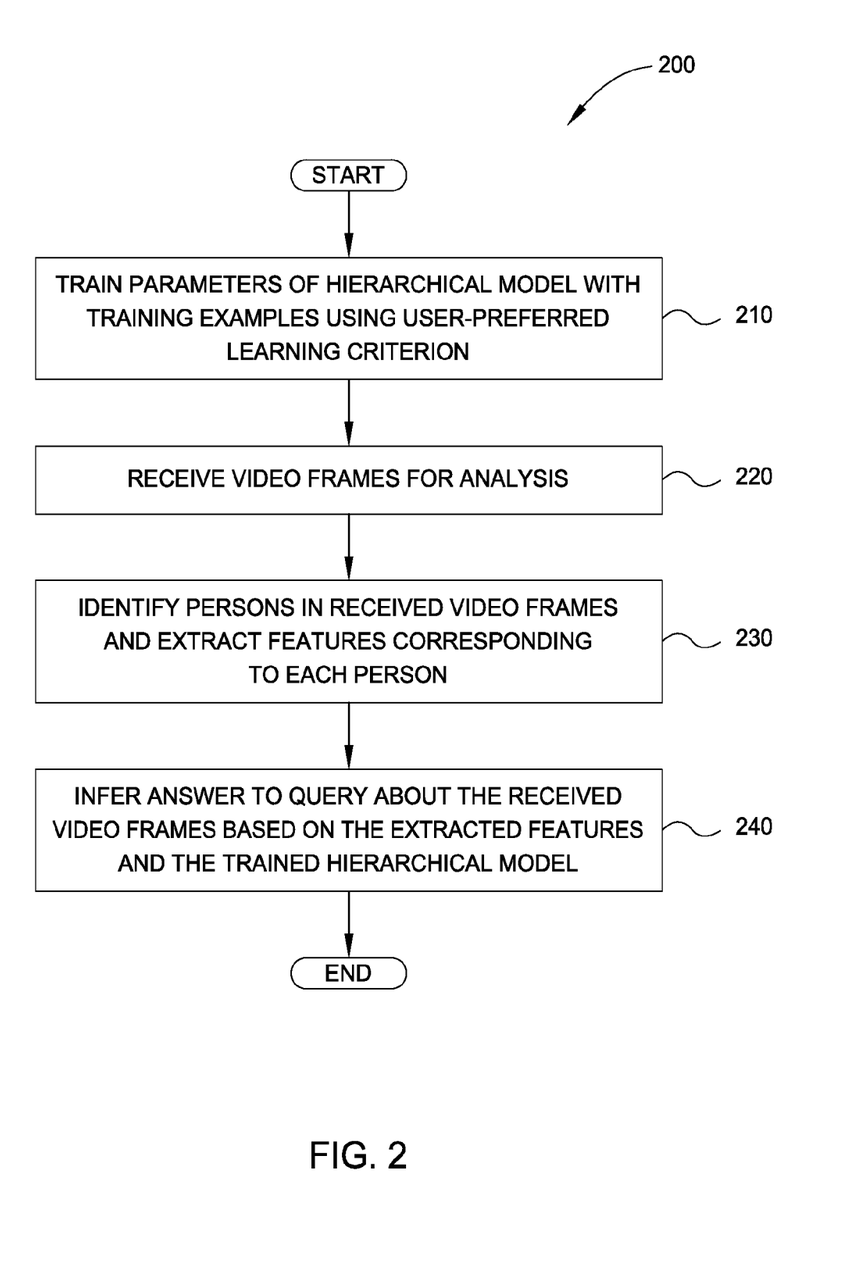
FIG. 2 illustrates a method for determining social roles from multi-person scenes using a hierarchical model, according to an embodiment of the invention.

FIG. 2 illustrates a method 200 for determining social roles from multi-person scenes using a hierarchical model, according to an embodiment. As shown, the method 200 begins at step 210, where a learning application trains parameters of a hierarchical model with training examples using user-preferred learning criteria. As discussed, the hierarchical model may generally represent human activities at multiple levels of detail. Given a set of N training example(s) $\langle x^n, y^n, h^n, r^n, l^n \rangle$ (1, 2, ..., N) which capture example execution(s) of the game (or other group activity or interaction) and include annotations, the learning application trains the parameter vector $w^T \equiv [w_1^T, w_2^T, w_3^T, w_4^T]$.

In one embodiment, the following example structured support vector machine (SVM) formulation may be used to learn the model:

$$\min_{w, \xi \geq 0} \tfrac{1}{2}\|w\|^2 + C\Sigma_{n=1}^N \xi_n$$

$$s.t. F_w(x^n, y^n, h^n, r^n, l^n) - F_w(x^n, y, h, r, l^n) \geq \Delta(y, y^n, h, h^n, r, r^n) - \xi_n \ \forall n, y, h, r, \quad (6)$$

where $\Delta(y, y^n, r, r^n, h, h^n)$ measures the joint loss between the ground-truth event label, social role labels, and action labels $(y^n, r^n, h^n)$ compared with the hypothesized labels $(y, r, h)$. Here, the joint loss function may be defined, for example, as a weighted combination of the loss on different terms:

$$\Delta(y, y^n, r, r^n, h, h^n) = \Delta_{0/1}(y, y^n) + \nu \Sigma_i \Delta_{0/1}(r_i, r_i^n) + (1 - \mu - \nu) \Sigma_i \Delta_{0/1}(h_i, h_i^n), \quad (7)$$

where $0 \leq \mu \leq 1$, $0 \leq \nu \leq 1$ balance the contribution terms. This learning framework may be used to carry out different inferences based on a user's preferences. For example, the user may prefer to use the model to find a central figure such as an "attacker," to recognize actions and social roles for each player, etc. The loss function may be chosen to optimize learning for such a user-preferred inference, while the model structure remains constant. For example, if the user prefers social role recognition, the value of $\mu$ in equation (7) may be set to zero to make the formulation directly optimize social roles. The optimized model parameters in such a case may, for example, misinterpret actions and events to make better predictions about social roles. That is, the parameters may be optimized such that the model may correctly predict social roles by making less correct predictions about actions and events.

Although described above with respect to a multi-class classification problem in which performance would typically be measured by overall accuracy and the learning approach used is to directly optimize the overall accuracy by 0-1 loss $\Delta_{0/1}$ defined in equation (7), alternative embodiments may include imbalanced datasets (e.g., the number of central figures is very small compared to the number of training examples) for which overall accuracy would not be an appropriate measurement of performance. In such case, mean per-class accuracy may be a better performance measurement, and the loss function may, for example, be chosen to adjust the loss according to the distribution of the classes on the training data:

$$\Delta_{bal}(u, u^n) = \begin{cases} \dfrac{1}{m_p} & \text{if } u \neq u^n \text{ and } u^n = p \\ 0 & \text{otherwise} \end{cases} \quad (8)$$

where $m_p$ is the number of examples with class label p. Assuming N training examples, $\Sigma_{n=1}^N \Delta_{bal}(u, u^n)$ directly corresponds to the mean per-class accuracy on the training data. Use of $\Delta_{bal}(u, u^n)$ as the loss function directly maximizes the mean per-class accuracy, rather than the overall accuracy.

At step 220, an inference application receives a set of video frames for analysis. The video frames may generally depict any scene or scenes in which test execution(s) of a game or other group activit(ies) or interaction(s) may occur, such as a scene from a sports game or an interactive video game, surveillance footage, etc.

At step 230, the inference application preprocesses the received video frames of the test execution(s) to identify persons in the video frames and extract features (e.g., HOG features) corresponding to each person. Person detection and feature extract may be performed using any feasible techniques. For example, to encode temporal information, multiple-video-frame tracklets may be extracted for each person based on data association, and features extracted from each person's bounding box may be concatenated to create feature vectors for those persons. Note, in such a case, training at step 220 would also typically be based on feature vectors of the same kind. In yet another embodiment, the feature vector may not be a vector of raw features, but rather an N-dimensional vector in which the k-th entry is a score of classifying the instance using a multi-class classifier trained based on raw features and associated actions. In embodiments involving teams of persons, such as team sports, the inference application may further separate the persons into different teams (e.g., based on the color histogram of each person).

At step 240, the inference application infers an answer to a query about the received video frames of the test execution(s) based on the extracted features and the trained hierarchical model. As discussed, a user may wish to pose a variety of queries for any given set of video frames. The hierarchical model disclosed herein can formulate queries about any individual variable at any level of detail. Queries may be formulated about the overall event label y for the scene, or the social role label $r_j$ of a person in the scene, etc.

For example, in the context of field hockey, a query may ask what action (e.g., "running," "standing," etc.) a particular person is engaging in. As another example, the query may ask what overall event ("attack play," "penalty corner," etc.) is taking place. Of course, a query may also ask, e.g., both what action a particular person is engaging in and what overall event is taking place.

Given a video and a query variable q, the inference problem may be defined as finding a hierarchical event representation that maximizes the scoring function $F_w(x, y, h, r, I)$ while fixing the value of q to its possible values. The margin, or difference in model scores between values, for the variable q may be examined to determine a score for its setting. For example, if q is the action of one person (i.e., one of the $h_i$), then the inference application may compute the maximum value of the scoring function $F_w$ while fixing q to each possible action. The inference application may then set the score for the person performing each action as the difference between the scoring function score when fixing q to that possible action and the scoring function score of the next best action. That is, the inference application may output a vector having such scores for each possible q.

For a given video and query variable q, the inference discussed above may include solving an optimization problem which may be written, for example, as:

$$\max\nolimits_{y,h,r\backslash q} F_w(x,y,h,r,I) = \max\nolimits_{y,h,r\backslash q} w^T \Phi(x,y,h,r,I). \quad (9)$$

Such an optimization problem is generally NP-hard, as it involves a combinatorial search. A coordinate ascent style algorithm may, however, be used to approximately solve equation (9) by iteratively optimizing one variable at a time while fixing the other variables, until converge. At each step of iterative optimization, the inference application may enumerate possible $h \in \mathcal{H}$ to predict the best action label $h^*$, as action labels lack structure.

Optimizing social roles r is more challenging due to the correlation between r and the graph structure $\mathcal{G}$. As discussed, the graph structure $\mathcal{G}$ may itself depend on, for example, who is a central figure, if any. In one embodiment, the inference application may enumerate possible graph structures (k=0, 1, . . . , K) given the hierarchical model, where each k-th person is regarded, one at a time, as the central figure if k≥1, and k=0 corresponds to a further graph in which no person is the central figure. Let $r^k$ be the social roles r when the k-th person is the central figure, i.e., $r_k$=1. In such a case, r may be inferred by solving an optimization problem which may be written, for example, as:

$$\max_{0 \le k \le K} \max_{r^k} w^T \Phi(x, y, h, r^k, I). \quad (10)$$

Here, the inner maximization of $r^k$ with a fixed k is a standard max-inference problem in an undirected graphical model. In one embodiment, loopy belief propagation (BP) may be used to solve the inner max-inference problem.

Figure 3:
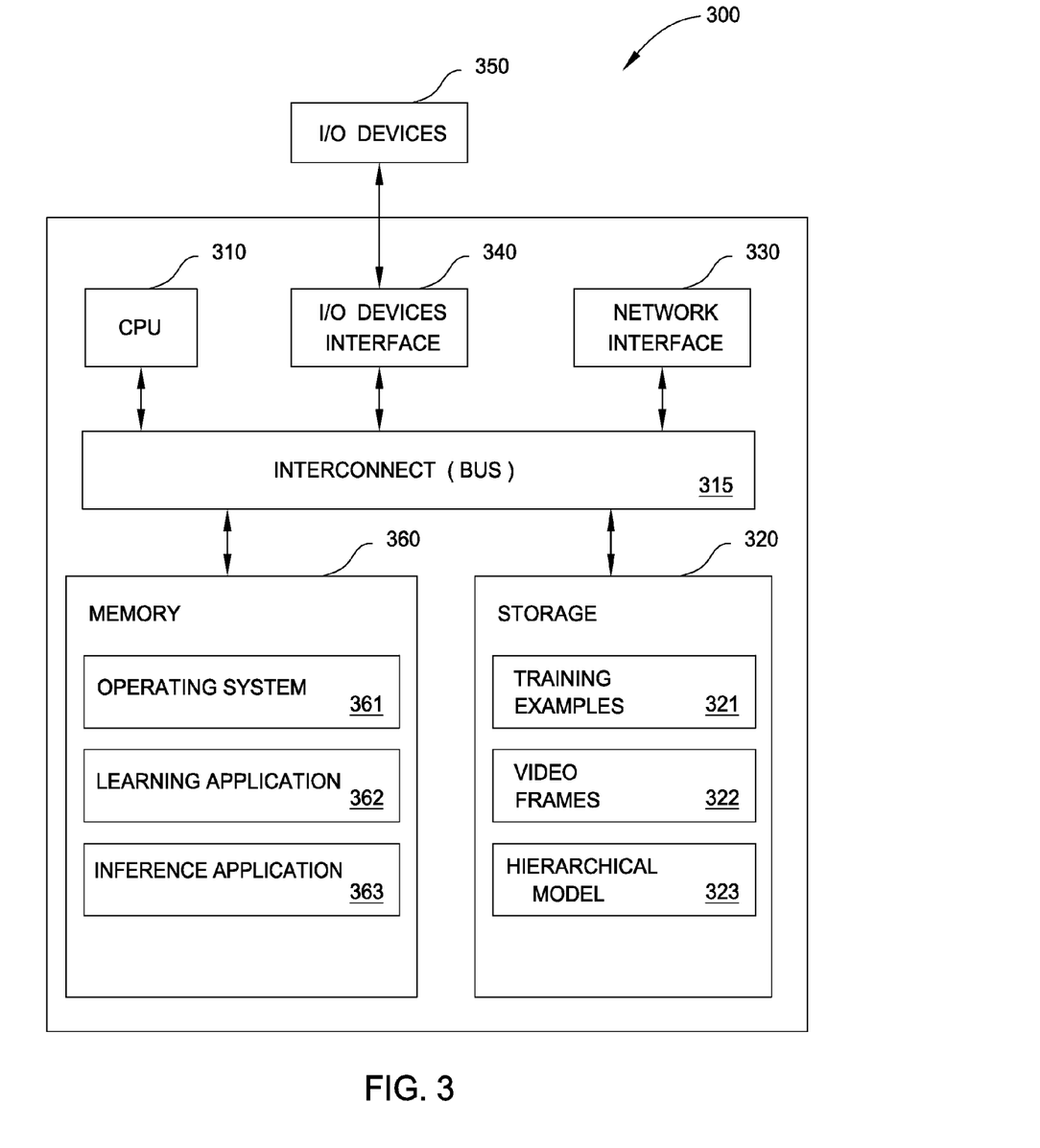
FIG. 3 depicts a block diagram of a system in which an embodiment may be implemented.

FIG. 3 illustrates a system 300 in which aspects of the invention may be implemented. As shown, the system 300 includes, without limitation, a central processing unit (CPU) 310, a network interface 330, an interconnect 315, a memory 360 and storage 320. The system 300 may also include an I/O device interface 340 connecting I/O devices 350 (e.g., keyboard, display and mouse devices) to the system 300.

The CPU 310 retrieves and executes programming instructions stored in the memory 360. Similarly, the CPU 310 stores and retrieves application data residing in the memory 360. The interconnect 315 facilitates transmission, such as of programming instructions and application data, between the CPU 310, I/O device interface 340, storage 320, network interface 330, and memory 360. CPU 310 is included to be representative of a single CPU, multiple CPUs, a single CPU having multiple processing cores, and the like. And the memory 360 is generally included to be representative of a random access memory. The storage 320 may be a disk drive storage device. Although shown as a single unit, the storage 320 may be a combination of fixed and/or removable storage devices, such as tape drives, removable memory cards or optical storage, network attached storage (NAS), or a storage area-network (SAN). Further, system 300 is included to be representative of a physical computing system as well as virtual machine instances hosted on a set of underlying physical computing systems. Further still, although shown as a single computing system, one of ordinary skill in the art will recognized that the components of the system 300 shown in FIG. 3 may be distributed across multiple computing systems connected by a data communications network.

As shown, the memory 360 includes an operating system 361 and applications 362-363. Illustratively, the operating system may include Microsoft Windows®. The applications 362-363 include a learning application 362 and an inference application 363. The learning application 362 may be configured to train parameters of a hierarchical model 323, which describes human behavior at multiple levels of detail, based on annotated training examples 321 depicting example executions of a game or other group activity or interaction. As discussed, the training examples 321 may include sample video frame sequences annotated with action, social role, event, and other labels which are appropriate for the hierarchical model 323. For example, such labels may be supplied by a user. In one embodiment, the learning application 362 may provide a general learning framework which permits training to be tailored for various inferences by modifying learning criteria (e.g., a loss function), as discussed above with respect to step 210 of method 200.

The inference application 363 may use a trained hierarchical model to infer answers to queries about variable(s) at any level of detail for test execution(s), which may be captured, e.g., on video. In one embodiment, the inference application may determine scores for each possible value of the query variable by finding the best hierarchical event representation that maximizes a scoring function while fixing the value of the query variable to its possible values. For example, the inference application may solve, or approximately solve the optimization problem of equation (8), as discussed above with respect to step 240.

Advantageously, techniques disclosed herein may improve the activity recognition of engaging objects in an event captured by video or any other sensory devices at multiple levels of detail. Modeling the connectivity among activity elements throughout an event may be done based on various graph types. In particular, hierarchical models naturally capture the interdependencies between actions, social roles, high-level events, and other levels of detail, and further permit flexible inference of social roles and their dependencies in a given scene. For example, the hierarchical model accounts for the fact that persons having some social roles may be more likely to perform certain actions, and vice versa, as well as interdependencies between other levels of detail. Doing so permits improved activity recognition at the action level, the social role level, the scene event level, etc., as well as combinations of such levels. Further, techniques disclosed herein may be applied to recognize human activities in a variety of settings in which group activities may occur, such as sports games, interactive video games, and security/surveillance. In some applications such as interactive video games, the recognized human activities may be fed back into a system to, for example, adaptively generate content based on the activities.

While the foregoing is directed to aspects of the present invention, other and further aspects of the invention may be devised without departing from the basic scope thereof, and the scope thereof is determined by the claims that follow.

What is claimed is:

1. A computer-implemented method for recognizing and analyzing activities, comprising:
    learning, via one or more processors, parameters of a classifier in a training operation based on feature vectors and activity elements corresponding to objects during one or more annotated example executions, wherein the classifier represents activity elements at multiple levels of detail;
    extracting feature vectors corresponding to one or more objects that interact during a test execution; and
    determining, based on the extracted feature vectors and using the classifier, activity elements associated with the one or more objects, at the multiple levels of detail.

2. The method of claim 1, wherein the classifier represents a set of graph structures, the graph structures each including the activity elements as vertices and, further including, edges between one or more of the vertices as correlations or statistical relationships between corresponding activity elements.

3. The method of claim 2, wherein each of the activity elements includes one of an action of one of the one or more objects, a social role of one of the one or more objects, and an event.

4. The method of claim 3, wherein one or more of the one or more objects are labeled with one or more activity elements including actions, social roles, and events.

5. The method of claim 3, wherein the classifier includes a unary role model modeling the social roles of the one or more objects, wherein the unary role model accounts for spatial locations of the one or more objects.

6. The method of claim 5, wherein the classifier further includes a pairwise role model modeling the interactions of the one or more objects, wherein the pairwise role model accounts for the spatial locations of the objects.

7. The method of claim 6, wherein the unary role model is a potential function representing dependencies between actions and social roles and role-specific locations, and wherein the pairwise role model is a potential function representing dependencies between pairs of social roles under an event.

8. The method of claim 4, wherein the determining includes, iteratively:
    enumerating potential actions to determine best action labels for each of the one or more objects while holding the event and the social roles constant;
    enumerating potential events to determine a best event label for a scene depicted in video frames while holding the actions and the social roles constant; and
    enumerating potential graph structures which describe relationships between the one or more objects to determine best social role labels for each object while holding the event and the actions constant.

9. The method of claim 8, wherein in all but one of the potential enumerated graph structures, one of the one or more objects is represented as a central figure to whom all other objects of the one or more objects are connected, and each of the remaining objects is connected to neighboring objects that appear within a predefined distance of the one of the one or more objects.

10. The method of claim 1, wherein the feature vectors are extracted from video frames received from one or more cameras capturing the example and test executions.

11. A non-transitory computer-readable storage medium storing instructions, which when executed by a computer system, perform operations for recognizing and analyzing activities, the operations comprising:
    learning, via one or more processors, parameters of a classifier in a training operation based on feature vectors and activity elements corresponding to objects during one or more annotated example executions, wherein the classifier represents activity elements at multiple levels of detail;
    extracting feature vectors corresponding to one or more objects that interact during a test execution; and
    determining, based on the extracted feature vectors and using the classifier, activity elements associated with the one or more objects, at the multiple levels of detail.

12. The computer-readable storage medium of claim 11, wherein the classifier represents a set of graph structures, the graph structures each including the activity elements as vertices and, further including, edges between one or more of the vertices as correlations or statistical relationships between corresponding activity elements.

13. The computer-readable storage medium of claim 12, wherein each of the activity elements includes one of an action of one of the one or more objects, a social role of one of the one or more objects, and an event.

14. The computer-readable storage medium of claim 13, wherein one or more of the one or more objects are labeled with one or more activity elements including actions, social roles, and events.

15. The computer-readable storage medium of claim 13, wherein the classifier includes a unary role model modeling the social roles of the one or more objects, wherein the unary role model accounts for spatial locations of the one or more objects.

16. The computer-readable storage medium of claim 15, wherein the classifier further includes a pairwise role model modeling the interactions of the one or more objects, wherein the pairwise role model accounts for the spatial locations of the objects.

17. The computer-readable storage medium of claim 16, wherein the unary role model is a potential function representing dependencies between actions and social roles and role-specific locations, and wherein the pairwise role model is a potential function representing dependencies between pairs of social roles under an event.

18. The computer-readable storage medium of claim 14, wherein the determining includes, iteratively:
    enumerating potential actions to determine best action labels for each of the one or more objects while holding the event and the social roles constant;
    enumerating potential events to determine a best event label for a scene depicted in video frames while holding the actions and the social roles constant; and
    enumerating potential graph structures which describe relationships between the one or more objects to determine best social role labels for each object while holding the event and the actions constant.

19. The computer-readable storage medium of claim 18, wherein in all but one of the potential enumerated graph structures, one of the one or more objects is represented as a central figure to whom all other objects of the one or more objects are connected, and each of the remaining objects is connected to neighboring objects that appear within a predefined distance of the one of the one or more objects.

20. The computer-readable storage medium of claim 11, wherein the feature vectors are extracted from video frames received from one or more cameras capturing the example and test executions.

21. A system, comprising:
- a processor; and
- a memory, wherein the memory includes an application program configured to perform operations for recognizing and analyzing activities, the operations comprising:
  - learning parameters of a classifier in a training operation based on feature vectors and activity elements corresponding to objects during one or more annotated example executions, wherein the classifier represents activity elements at multiple levels of detail,
  - extracting feature vectors corresponding to one or more objects that interact during a test execution, and
  - determining, based on the extracted feature vectors and using the classifier, activity elements associated with the one or more objects, at the multiple levels of detail.

22. A computer-implemented method for recognizing and analyzing activities in a set of video frames, comprising:
- learning parameters of a hierarchical model based on learning criteria, wherein the hierarchical model includes a plurality of levels of detail at which activity elements are modeled;
- identifying objects and extracting features corresponding to the identified objects; and
- determining, based on at least the extracted features and the hierarchical model, an answer to a query, wherein the query relates to one or more of the activity elements at one or more of the levels of detail.

* * * * *

UNITED STATES PATENT AND TRADEMARK OFFICE
CERTIFICATE OF CORRECTION

PATENT NO. : 9,846,845 B2  
APPLICATION NO. : 13/683656  
DATED : December 19, 2017  
INVENTOR(S) : Leonid Sigal et al.

Page 1 of 1

It is certified that error appears in the above-identified patent and that said Letters Patent is hereby corrected as shown below:

On the Title Page

On the page 2, in Column 1, under "Other Publications", Line 3, delete "Tranactions" and insert -- Transactions --, therefor.

On the page 2, in Column 1, under "Other Publications", Line 6, delete "Internation" and insert -- International --, therefor.

On the page 2, in Column 1, under "Other Publications", Line 9, delete "Occulsion" and insert -- Occlusion --, therefor.

In the Specification

In Column 1, Line 35, after "detail" insert -- . --.

In Column 6, Line 29, delete "$w_{3abc}$" and insert -- $w_{3bc}$ --, therefor.

In Column 7, Line 38, delete "$1^n$" and insert -- $l^n$ --, therefor.

In Column 7, Line 47, delete "$l^n)-F_w(x^n,y,h,r,l^n)$" and insert -- $I^n)-F_w(x^n,y,h,r,I^n)$ --, therefor.

Signed and Sealed this  
Tenth Day of April, 2018

Andrei Iancu  
*Director of the United States Patent and Trademark Office*